United States Patent Office 2,882,314
Patented Apr. 14, 1959

2,882,314

PREPARATION OF ORGANIC PHOSPHONYL HALIDES

Charles W. Weber, Jersey City, N.J., assignor to The M. W. Kellogg Company, Jersey City, N.J., a corporation of Delaware No Drawing. Application May 11, 1955
Serial No. 507,729

18 Claims. (Cl. 260—543)

This invention relates to a new and improved process for the production of organic phosphonyl halides and derivatives derived therefrom. In one aspect, the invention relates to an improved process for the production of alkane phosphonyl dihalides including both acyclic and alicyclic alkane phosphonyl dihalides. In another more particular aspect, this invention relates to an improved method for the production of methane phosphonyl dichloride.

The organic phosphonyl halides and especially methane phosphonyl dichloride are much in demand as chemical intermediate reactants for the production of more complex organic phosphorus compounds such as the corresponding esters, free acids, and amides by conventional methods, which are useful as fungicides, insecticides, pharmaceuticals, petroleum additives for improving lubricating oils and polymer additives. Prior to the present invention relatively low molecular weight organic phosphonyl halides have been obtained by devious and roundabout methods involving numerous chemical and mechanical steps, which methods have been inefficient and expensive. Less involved methods for the production of organic phosphonyl halides are not applicable to the production of low molecular weight analogues in good yields. Methane phosphonyl dichloride is a particularly difficult compound to produce. For example, the reaction between methane, phosphorus trichloride and oxygen is a very poor reaction and leads to the production of methane phosphonyl dichloride in very low yield although higher molecular weight alkanes such as n-heptane react with phosphorus trichloride and oxygen to produce the corresponding alkane phosphonyl dichlorides in somewhat better yield.

It is therefore an object of the present invention to provide a new and improved process for producing organic phosphonyl halides.

Another object is to produce organic phosphonyl halides with the maximum utilization of reactants and the minimum formation of by-products.

Another object is to provide a novel direct process for the production of organic phosphonyl halides.

Another object is to provide an effective and economical process by which organic phosphonyl halides may be prepared in high yield with good selectivity.

A further object is to provide an improved process for the direct production of methane phosphonyl dichloride in good yield and with good selectivity.

Various other objects and advantages of the present invention will become apparent to those skilled in the art from the accompanying description and disclosure.

In accordance with the present invention organic phosphonyl halides are produced by a process which comprises reacting an organic aldehyde and a phosphorus trihalide in the presence of an elemental metal and an inorganic material comprising iodine including free iodine. The organic phosphonyl halides produced to best advantage in accordance with the present invention are represented by the general formula:

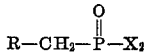

wherein X represents any of the halogens and wherein R is a hydrogen atom or an organic radical including substituted and unsubstituted aryl radicals, and substituted and unsubstituted acyclic and alicyclic alkyl radicals. For the purpose of the present invention, the carbon atom which is linked directly to the phosphorus atom of the product is referred to herein as the alpha carbon atom, the substituent on this alpha carbon atom is referred to as the alpha substituent, and the —CH$_2$— radical of the above formula is referred to as the alpha methylene radical.

As above-stated the process of the present invention is effected in the presence of an elemental metal and an inorganic material comprising iodine. The combination of these two materials leads to the direct production of organic phosphonyl halides having a methylene group linked directly to the phosphorus atom. The combination of these two materials is referred to herein as the catalyst mixture. It has been found that in order to produce the organic phosphonyl halides having the above-defined general formula

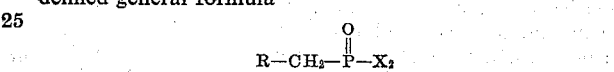

by the reaction of an organic aldehyde and a phosphorus trihalide, it is essential that both components of the catalyst mixture be employed.

The metals used to best advantage as one component of the catalyst mixture of the present invention are those which have a valence of at least 2 when in the combined or ionic state and are preferably those metals of groups II, IV and VIII of the periodic table. Typical examples of the preferred elemental metal component are those metals of group II of the periodic table such as zinc, strontium, and cadmium; metals of group IV of the periodic table such as tin, titanium and lead; and metals of group VIII of the periodic table such as iron, cobalt and nickel. Other suitable metals which may also be used include manganese and chromium. Of these metals iron has been found to be a particularly effective metal component of the catalyst mixture. The iron may be added to the reaction zone as elemental iron filings, for example, or it may be derived from the wall of a steel reaction vessel as may any of the other suitable metals.

The inorganic iodine component of the catalyst mixture which is employed in accordance with the present invention includes those of the metal iodide type such as sodium iodide, potassium iodide, aluminum iodide, zinc iodide, cobalt iodide, nickel iodide, manganese iodide and any other metal iodide; inorganic phosphorus iodides such as phosphorus diiodide; and free iodine. Phosphorus triiodide, although classed as a phosphorus trihalide reactant, may also be used as the iodine component of the catalyst mixture.

The weight ratio of the uncombined metal component to the iodine component of the catalyst mixture can vary over a wide range such as between about 30:1 and about 1:5 but generally a weight ratio of the metal component to the iodine component of between about 20:1 and about 5:1 is employed, and preferably between about 15:1 and about 2:1. It is to be understood that mixtures of the various metals and mixtures of the materials comprising iodine may be employed without departing from the scope of the present invention.

It has been found that the reaction between an organic aldehyde and a phosphorus trihalide in the presence of a catalyst mixture containing an elemental metal component such as elemental iron, and an iodine component such as free iodine, proceeds to first form an alpha-halogenated organic phosphonyl halide which reacts further in the presence of the metal component and the iodine component to produce an organic phosphonyl halide having an alpha methylene radical, namely, a —CH$_2$— radical, linked directly to the phosphorus atom. In effect, therefore, the halogen atom on the alpha carbon atom of the intermediate alpha-halogenated organic phosphonyl halide is replaced with a hydrogen atom during the course of the reaction, or in other words, a disproportionation of the alpha-halogenated organic phosphonyl halide intermediate occurs.

The presence of free iron, for example, and the material comprising iodine in the reaction mixture containing an organic aldehyde and a phosphorus trihalide accelerates the formation of the intermediate alpha-halogenated organic phosphonyl halide, which reaction is further accelerated by the disproportionation of the alpha-halogenated organic phosphonyl halide which takes place in the presence of the metal and the inorganic material comprising iodine, to yield the desired organic phosphonyl halide having the formula:

where R and X are as defined hereinabove. This coaction between the first reaction, involving the reaction of an organic aldehyde and a phosphorus trihalide, and the second reaction, involving disproportionation of the intermediate alpha-halogenated organic phosphonyl halide, is brought about by the use of the elemental metal component such as iron and the iodine component such as free iodine in both stages of the reaction.

In the aforesaid embodiment of the present invention, an organic phosphonyl halide having the formula

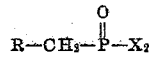

is produced directly by reacting an organic aldehyde (RCHO) and a phosphorus trihalide (PX$_3$) in the presence of the catalyst mixture containing a metal component such as elemental iron and an iodine component which reaction proceeds through the intermediate alpha-halogenated organic phosphonyl halide. The intermediate alpha-halogenated organic phosphonyl halide disproportionates, in the presence of the catalyst mixture, almost as soon as it is formed yielding an organic phosphonyl halide having a methylene group linked to the phosphorus atom. This embodiment of the present invention, which is the preferred embodiment, is illustrated by the following general equation:

(1)
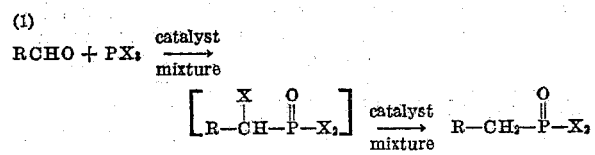

wherein X is a halogen atom and wherein R is a hydrogen atom or an organic radical including substituted and unsubstituted acyclic and alicyclic alkyl radicals, and aryl radicals. In general, the R radical of the product is the same as the R radical of the organic aldehyde reactant.

The organic aldehydes used in accordance with the present invention include organic aldehydes in which the radical linked to the formyl or aldehydo group (—CHO) is hydrogen or an organic radical including the substituted and unsubstituted aryl and acyclic and alicyclic alkyl radicals and are preferably those which are free of aliphatic unsaturation. Of such organic aldehydes, those containing between one and ten carbon atoms per molecule are preferred although higher molecular weight aldehydes such as those having up to twenty carbon atoms per molecule may also be employed. The hydrogen atoms of the organic radical which is linked to the formyl group may be substituted with one or more substituents such as the halogens and aryl, nitro and cyano radicals.

Typical examples of the organic aldehydes which are used in accordance with the present invention are as follows: formaldehyde, acetaldehyde, isopropanal, butanal, decanal, hexadecanal, cyclopentyl formaldehyde, hexahydrobenzaldehyde, hexahydrophenyl acetaldehyde, benzaldehyde, 2-naphthaldehyde, 4-methyl benzaldehyde, chloral, 4-chlorobenzaldehyde, 2-nitrobenzaldehyde, 3-nitrobenzaldehyde, 2,5-dinitrobenzaldehyde and the like.

It is to be understood that any material which produces formaldehyde when heated to a temperature within the temperature range employed in accordance with the present invention may also be employed as the organic aldehyde reactant. It is known that formaldehyde is seldom encountered or used in its pure monomeric state inasmuch as it polymerizes very readily to cyclic polyoxy methylenes such as symmetrical trioxane and to acyclic polyoxy methylenes such as paraformaldehyde. As a matter of convenience, therefore, the formaldehyde is usually added to the reaction zone in the form of one of its polymers. Inasmuch as these polymers break down into the formaldehyde unit (HCHO) during the course of the reaction conducted in accordance with this invention and are thus equivalent to monomeric formaldehyde, this reactant is referred to herein as formaldehyde as such.

The inorganic phosphorus trihalide reactant used in accordance with the present invention is preferably a trivalent phosphorus trihalide. Typical examples of suitable phosphorus trihalides are as follows: phosphorus trifluoride, phosphorus trichloride, phosphorus tribromide, and phosphorus triiodide; and mixed phosphorus trihalides such as difluorophosphorus chloride, difluorophosphorus iodide, dichlorophosphorus fluoride, chlorobromophosphorus fluoride, and dichlorophosphorus bromide; and diphosphorustetraiodide. The particular phosphorus trihalide employed depends upon the ultimate product desired. When producing an organic phosphonyl dibromide, for example, phosphorus tribromide is preferred. Mixtures of the phosphorus trihalides may be employed without departing from the scope of the present invention.

In another embodiment of the present invention, an alpha-halogenated organic phosphonyl halide obtained by a reaction other than that involving reaction of an organic aldehyde and a phosphorus trihalide in the presence of the metal and iodine catalyst components, is disproportionated in the presence of the aforesaid catalyst mixture to yield the desired product having the formula

The alpha-halogenated organic phosphonyl halide which is used as the starting material in accordance with this second embodiment of the present invention has the general formula:

wherein X represents any of the halogens and wherein R is selected from the group consisting of a hydrogen atom and an organic radical including substituted and unsubstituted aryl and acyclic and alicyclic alkyl radicals. When R is an organic radical the hydrogen atoms of this radical may be substituted with one or more substituents such as the halogens and aryl, nitro and cyano radicals. Such alpha-halogenated organic phosphonyl halides are preferably those containing between one and ten carbon atoms per molecule. In general, the R radical of the alpha-halogenated organic phosphonyl halides is selected from the same classes as the R radical of the organic aldehyde previously discussed and is the same as the R radical found in the desired product having the formula

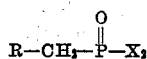

This second embodiment of the present invention is represented by the following general equation:

(2) 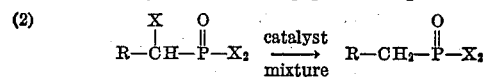

wherein X and R are as previously discussed.

Typical examples of suitable alpha-halogenated organic phosphonyl halides which may be used are chloromethane phosphonyl dichloride, bromomethane phosphonyl difluoride, alpha, beta-dichlorobutane phosphonyl dichloride, alpha-chloropentane phosphonyl dibromide, alpha-chloroisopentane phosphonyl dichloride, alpha-chlorobenzyl phosphonyl dichloride, cyclohexyl-alpha-chloromethane phosphonyl dibromide, 2-nitrophenyl-alpha-chloromethane phosphonyl dichloride and 4-chlorophenyl-alpha-bromomethane phosphonyl dibromide.

In this second embodiment of the present invention, the alpha-halo organic phosphonyl dihalide is charged initially as the starting material to the reaction zone along with the elemental metal component and the iodine component to yield an organic phosphonyl halide having an alpha methylene group.

The alpha-halogenated organic phosphonyl dihalides can be obtained by reacting an organic aldehyde and a phosphorus trihalide at elevated temperatures or by reacting an alpha-halogenated organic ether with a phosphorus trihalide at elevated temperatures. For example, when formaldehyde and phosphorus trichloride are reacted in a sealed reaction vessel at about 250° C. for a reaction time of between about three and about six hours, chloromethane phosphonyl dichloride is obtained in good yield. When an alpha-halogenated organic ether, such as alpha-chloroethyl ethyl ether or bis-(alpha-chloroethyl) ether, are reacted with a phosphorus trihalide such as phosphorus trichloride at a temperature between about 150° C. and about 275° C., an alpha-halogenated organic phosphonyl dihalide, such as chloroethane phosphonyl dichloride, is produced.

Attempts to produce an organic phosphonyl dihalide of the type having the formula

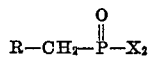

by reduction of an alpha-halo organic phosphonyl dihalide having the formula

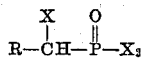

in the presence of hydrogen have been unsuccessful. It has been found that the use of the catalyst mixture containing an elemental metal component such as iron and an iodine component such as free iodine leads to the specific replacement of the alpha-halogen atom with a hydrogen atom.

The mol ratio of the uncombined metal and the inorganic material comprising iodine, each with respect to the phosphorus trihalide reactant or the alpha-halogenated organic phosphonyl halide reactant, may vary over relatively wide limits without departing from the scope of this invention. In general, between about 0.01 and about 2 mols of metal is used per mol of phosphorus-containing reactant and preferably between about 0.1 mol and about 1 mol. The iodine component is generally used in an amount between about 0.001 mol and about 1 mol per mol of phosphorus-containing reactant, and preferably between about 0.01 mol and about 0.5 mol per mol of phosphorus-containing reactant is employed.

Generally, the mol ratio of the organic aldehyde with respect to the phosphorus trihalide reactant ranges between about 0.05 and about 2.0, the preferable range being between about 0.1 and about 1. It is preferable to use an excess of the phosphorus trihalide reactant when an organic phosphonyl dihalide is desired as the ultimate product. An excessive use of phosphorus trihalide with respect to the organic aldehyde prevents the introduction of more than one organic group into the phosphorus trihalide reactant thereby avoiding the formation of excessive amounts of by-products.

When producing ethane phosphonyl dichloride, for example, in accordance with the present invention by the reaction of acetaldehyde and phosphorus trichloride, an excess of phosphorus trichloride will keep the formation of the by-product, diethyl phosphonyl monochloride, at a minimum. When it is desired to produce such organic phosphonyl monohalides as the main reaction product of the present invention, at least 2 mols of organic aldehyde are employed per mol of phosphorus trihalide reactant. Alternatively, the organic phosphonyl monohalide may be produced by reacting at least equimolar amounts of the organic aldehyde with an organic phosphorus dihalide, such as ethyl dichlorophosphine in the presence of the catalyst mixture of the present invention.

The process of the present invention is operative at a temperature between about 150° C. and the decomposition temperature of the reactants. Generally, the temperature of the reaction will be below about 500° C. The reaction is effected at elevated temperatures by introducing the individual reactants either separately or together into a reaction zone, such as a steel bomb or glass lined bomb, and carrying out the reaction under autogenous conditions of pressure as a matter of convenience. However, imposed pressures up to 1000 pounds per square inch gage can be employed without departing from the scope of this invention. The preferred temperature range is between about 200° C. and about 300° C. The time of reaction may vary over relatively wide limits such as between about 10 minutes and about 20 hours, but the preferred reaction time has been found to be between about 1 and about 8 hours.

The by-products produced in accordance with the present invention are believed to be those having the structure

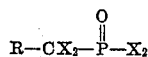

wherein R and X are as previously discussed, and/or the decomposition products of such alpha, alpha-dihalo organic phosphonyl halides such as phosphoryl halides and phosphorus halides.

Any free iodine which is formed during the course of the reaction or which remains in excess upon completion of the reaction is conveniently separated by treating the crude product with mercury followed by the removal of the mercury salts by filtration. The products of the reaction are further purified and recovered by conventional methods such as distillation of liquid products or crystallization of solid products depending upon the physical nature of the products. Liquid products are separated as almost 100 percent pure by fractional distillation.

The organic phosphonyl halides are isolated as such and used as an insecticide or are hydrolyzed to the corresponding organic phosphorus acids which are then converted to various ester derivatives, or the organic phosphonyl halides are converted directly to a desired type ester by the conventional methods known to those skilled in the art. These derivatives have many known uses to those skilled in the art as previously discussed such as fungicides and insecticides. The products are identified by the usual methods such as by determination of the boiling point and other such physical properties, determination of infrared spectra, percent composition analysis, mass spectrometer analysis, etc.

The reaction of the present invention may be carried out in continuous or batchwise systems without departing from the scope of this invention. The reaction may also be effected in the presence of diluents or solvents such as benzene, nitrobenzene, toluene and hexane in which the reactants are dissolved or dispersed by mechanical agitation or by conventional emulsifying agents. The diluent is present usually in an amount of between about 75 and about 25 volume percent of the total mixture.

It is to be understood that the choice of temperature of reaction, contact time, molar quantities of reactants to be preferred in any instance will depend upon the starting materials employed and the result desired and that the procedures employed for the isolation and purification of desired products will be dependent upon the physical nature of the products.

The following examples are offered as a better understanding of the present invention but the examples are not to be considered as unnecessarily limiting the present invention. The steel pressure bombs used in the following examples were composed of SAE 6150 steel. The bombs were electrically heated by a tubular heater controlled by a manually operated rheostat and mounted so that a uniform distribution of heat was obtained.

The sealed glass tube reactions were made by filling and then sealing the glass tubes which were then placed in an Aminco bomb and pressured on the outside with 1,000 pounds per square inch gage of an inert gas such as nitrogen to equalize the pressure attained within at the reaction temperature.

*Example 1*

This example illustrates the production of methane phosphonyl dichloride by disproportionation of chloromethane phosphonyl dichloride.

(1) A 105 ml. Aminco glass liner was charged with 45.2 grams (0.27 mol) of chloromethane phosphonyl dichloride, 8.4 grams (0.15 mol) of elemental iron filings and 3.4 grams (0.0135 mol) of free iodine. The bomb was pressured with 440 pounds per square inch gage of hydrogen (80 ml. of free space at 30° C. or 0.0962 mols of hydrogen). The contents of the bomb were then heated to a temperature of 250° C. and held at this temperature for a period of two hours. At the end of this period the gases were collected and analyzed and the bomb vented to atmospheric pressure. The collected gas was found to contain approximately the same amount of hydrogen as was originally charged indicating that no hydrogen was absorbed during the reaction.

The total crude semi-solid product in the bomb was transferred to a distillation flask and heated until no more liquid was collected. A total of 31.2 grams of brown liquid boiling between 133° C. and 172° C. at atmospheric pressure was obtained leaving a black solid residue (18.4 grams). Upon analysis it was shown that the solid residue contained 52.9 percent chlorine, 41.3 percent iron, 6.95 percent phosphorus, and 0.26 percent iodine. The brown liquid which contained some free iodine was diluted with chloroform, shaken with mercury and filtered to remove the mercury iodide salts. After evaporation of the chloroform, the residual liquid was distilled at atmospheric pressure yielding two fractions, namely, fraction 1 (4.4 grams) boiling between 75° C. and 135° C. and fraction 2 (16.3 grams) boiling between 135° C. and 165° C. Mass spectrometer analysis of fraction 2 showed it to contain 14.6 grams (0.11 mol) of methane phosphonyl dichloride which was equivalent to an over-all yield of 40 percent. Phosphorus trichloride and phosphoryl trichloride were identified as the main by-products of the reaction.

(2) The same reactants set forth in part (1) of this example are charged to an Aminco glass liner and the reaction is carried out as described above except that no hydrogen is charged to the reaction zone. Upon completion of the reaction, the reaction products are worked up in a similar manner. Methane phosphonyl dichloride is obtained in a yield of at least 40 percent.

(3) The chloromethane phosphonyl dichloride employed as a starting material in this example was obtained by the following procedure:

A 200 ml. steel pressure bomb was charged with 18.0 grams (0.2 mol) of trioxane (HCHO)$_3$ and 79 ml. (0.9 mol) of phosphorous trichloride. The bomb was then closed, placed in a reciprocating shaker and heated to 250° C. for a period of 7 hours. After cooling the bomb, it was vented to atmospheric pressure and the contents of the bomb were transferred to a distillation flask and distilled at atmospheric pressure. Two main fractions were obtained, namely, fraction 1 boiling between 50° C. and 85° C., and fraction 2 boiling between 190° C. and 210° C. Mass spectrometer analysis of fraction 2 showed it to consist essentially of chloromethane phosphonyl dichloride, obtained in an over-all yield of about 23 percent. There was no evidence of the deformation of methane phosphonyl dichloride.

(4) Chloromethane phosphonyl dichloride was also obtained by the following procedure:

A 200 ml. steel bomb was charged with 30 ml. (0.4 mol) of chloromethyl methyl ether and 53 ml. (0.6 mol) of phosphorus trichloride. The bomb was then closed, placed in a reciprocating shaker and heated at 250° C. for a period of 7 hours. The total crude product in the bomb was transferred to a distillation flask and distilled at atmospheric pressure to obtain two main fractions, namely, fraction 1 boiling between 40° C. and 100° C., and fraction 2 boiling between 188° C. and 211° C. Mass spectrometer analysis of fraction 2 showed it to consist essentially of chloromethane phosphonyl dichloride which was obtained in a 37 percent yield. No detectable amount of methane phosphonyl dichloride was observed.

*Example 2*

This example illustrates the production of methane phosphonyl dichloride by reaction between formaldehyde and phosphorus trichloride.

A 105 ml. Aminco glass liner is charged with 18 grams (0.2 mol) of trioxane (HCHO)$_3$, 53 ml. (0.6 mol) of phosphorus trichloride, 12.7 grams (0.05 mol) of free iodine and 5.6 grams (0.10 mol) of elemental iron filings. The bomb is closed and heated to a temperature of 275° C. for a period of 3 hours under autogenous conditions of pressure. The crude reaction product is then treated in the same manner as described in part (1) of Example 1 above. Methane phosphonyl dichloride is obtained in about a 20 percent yield.

*Example 3*

This example illustrates the production of benzyl phosphonyl dichloride.

A 105 ml. Aminco glass liner is charged with 51 ml. (0.5 mol) of benzaldehyde, 70 ml. (0.8 mol) of phosphorus trichloride, 12.7 grams (0.05 mol) of free iodine, and 8.4 grams (0.15 mol) of finely divided iron. The bomb is closed, and maintained at a temperature of 225° C. for a period of 4 hours. At the end of this period the total crude reaction product is treated in the same manner as described in part (1) of Example 1 above. Benzyl phosphonyl dichloride is obtained in a yield of about 40 percent.

Although the above examples describe the preparation of methane phosphonyl dichloride and benzyl phosphonyl dichloride, other organic phosphonyl dihalides may be prepared similarly by the process of this invention in accordance with the specific technique and reaction conditions of the examples by appropriate substitution of the starting materials. For example, acetaldehyde when substituted for formaldehyde or benzaldehyde in the above examples leads to the production of ethane phosphonyl dichloride. Similarly, reaction between 4-chlorobenzaldehyde and phosphorus trichloride in accordance with the present invention leads to the production of 4-chlorobenzyl phosphonyl dichloride in good yield.

It is to be understood that the source of the metal component, such as iron, of the catalyst mixture of the present invention may be the walls of the reaction vessel in which the reaction is effected. For example, the reaction between formaldehyde and phosphorus trichloride in the presence of an added metal iodide such as nickel iodide, proceeds to yield methane phosphonyl dichloride in good yield when the reaction is effected in a steel bomb such as an SAE 6150 steel bomb. On the other hand, the reaction between formaldehyde and phosphorus trichloride in the presence of a metal iodide such as nickel iodide, does not lead to the formation of methane phosphonyl dichloride when this reaction is effected in a glass lined reaction vessel in the absence of an added elemental metal such as free iron. It is preferred, however, to use noncatalytic reactor walls, such as glass, and to employ the metal catalyst component in the form of a screen or discrete particles such as granules or filings.

It has also been found that the iodine component is equally essential to the formation of the

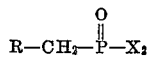

product as described herein. For example, the reaction between formaldehyde and phosphorus trichloride conducted in the presence of free iron, or conducted in a steel reaction vessel leads only to the formation of an alpha-halogenated organic phosphonyl dihalide with no detectable formation of the disproportionated product. The same applies for the reactions involving disproportionation of an alpha-halogenated organic phosphonyl halide in accordance with the second embodiment of this invention.

The present invention relates to the various embodiments of the method employed to obtain organic phosphonyl halides by the reaction between an organic aldehyde and a phosphorus trihalide in the presence of the catalyst mixture containing an elemental metal as one component and an inorganic material comprising iodine as a second component. This reaction proceeds through the intermediate alpha-halogenated organic phosphonyl halide which is disproportionated in the presence of the catalyst mixture to produce the corresponding organic phosphonyl halide having an alpha-methylene group linked directly to the phosphorus atom.

It is to be understood that although the metal component of the catalyst mixture is added or present as a free or elemental metal at the start of the reaction, it is postulated without limiting the scope of the present invention that the metal is perhaps catalytically effecting the reaction in a combined state as, for example, a metal salt or a metal complex with one or more of the reactants or iodine component. Therefore, the term "elemental or free metal" refers to the condition of the metal initially or as charged to the reaction zone.

Various modifications of the techniques employed and the optimum reaction conditions may become apparent to those skilled in the art without departing from the scope of this invention. The theory and reaction mechanism are offered as a means for better understanding the present invention and should not be construed as limiting the invention.

I claim:

1. A process which comprises reacting an organic aldehyde having from 1 to 20 carbon atoms per molecule and in which the formyl group is bonded to a member of the group consisting of hydrogen, an alkyl group and an aryl group, with a phosphorous trihalide in the presence of a catalyst consisting essentially of (A) and (B) wherein (A) is an elemental metal selected from the group consisting of a group II metal, a group IV metal, a group VIII metal, manganese and chromium; and wherein (B) is selected from the group consisting of free iodine, a metal iodide, and a phosphorus iodide at a temperature between about 150° C. and about 500° C. to produce an organic phosphonyl halide.

2. The process of claim 1 in which said elemental metal is iron.

3. The process of claim 1 in which said elemental metal is cobalt.

4. The process of claim 1 in which said elemental metal is nickel.

5. The process of claim 1 in which said elemental metal is zinc.

6. The process of claim 1 in which said elemental metal is tin.

7. The process of claim 1 in which said metal iodide is nickel iodide.

8. The process of claim 1 in which said metal iodide is zinc iodide.

9. The process of claim 1 in which said metal iodide is cobalt iodide.

10. The process of claim 1 in which said phosphorus iodide is phosphorus diiodide.

11. A process which comprises reacting an organic aldehyde having from 1 to 20 carbon atoms per molecule in which the formyl group is bonded to a member of the group consisting of hydrogen, an alkyl group and an aryl group, with a phosphorous trihalide in the presence of a catalyst consisting essentially of (A) and (B) wherein (A) is an elemental metal selected from the group consisting of a group II metal, a group IV metal, a group VIII metal, manganese and chromium; and wherein (B) is selected from the group consisting of free iodine, a metal iodide and a phosphorus iodide, at a temperature between about 150° C. and about 500° C. to produce an alpha-halo organic phosphonyl dihalide having from 1 to 20 carbon atoms per molecule, and reacting said alpha-halo organic phosphonyl dihalide in the presence of the aforesaid catalyst at a temperature between about 150° C. and about 500° C. to produce an organic phosphonyl dihalide having an alpha-methylene group, and recovering said organic phosphonyl dihalide as the product of the process.

12. A process which comprises reacting an organic aldehyde having from 1 to 10 carbon atoms per molecule and in which the formyl group is bonded to a member of the group consisting of hydrogen, an alkyl group and an aryl group, with a phosphorous trihalide in the presence of a catalyst consisting essentially of (A) and (B) wherein (A) is an elemental group VIII metal and wherein (B) is selected from the group consisting of free iodine, a metal iodide, and a phosphorus iodide at a temperature between about 150° C. and about 500° C. to produce an organic phosphonyl dihalide having a —CH₂— group bonded directly to phosphorus.

13. A process which comprises reacting an organic aldehyde having from 1 to 20 carbon atoms per molecule in which the formyl group is bonded to a member of the group consisting of hydrogen, an alkyl group and an aryl group, with a phosphorous trihalide at a temperature between about 150° C. and about 300° C. in the presence of a catalyst consisting essentially of (A) and (B) wherein (A) is an elemental group VIII metal, (B) is a member of the group consisting of free iodine, a metal iodide and a phosphorus iodide and the weight ratio of (A) to (B) is between about 30:1 and about 1:5, to produce an organic phosphonyl halide.

14. A process which comprises reacting an alpha-halo alkyl phosphonyl halide having from 1 to 10 carbon atoms per molecule in the presence of a catalyst consisting essentially of (A) and (B) wherein (A) is an elemental group VIII metal, and (B) is selected from the group consisting of free iodine, a metal iodide and a phosphorus iodide, at a temperature between about 200° C. and about 300° C. to produce an alkyl phosphonyl halide having an alpha-methylene radical.

15. A process for the production of an organic phosphonyl halide which comprises reacting an organic aldehyde having from 1 to 10 carbon atoms per molecule and in which the formyl group is bonded to a member of the group consisting of hydrogen, an alkyl group and an aryl group, and a phosphorous trihalide in the presence of an elemental group VIII metal and free iodine at a temperature between about 200° C. and about 300° C. to produce an organic phosphonyl halide.

16. A process for the production of a methane phosphonyl dihalide which comprises reacting formaldehyde and a phosphorous trihalide in the presence of iron and free iodine at a temperature between about 200° C. and about 300° C. to produce a methane phosphonyl dihalide as the product of the process.

17. A process for the production of methane phosphonyl dichloride which comprises reacting chloromethane phosphonyl dichloride in the presence of iron and free iodine at a temperature between about 200° C. and about 300° C. to produce methane phosphonyl dichloride and recovering said methane phosphonyl dichloride as the product of the process.

18. A process which comprises reacting benzaldehyde and a phosphorous trihalide in the presence of iron and free iodine at a temperature between about 200° C. and about 300° C. to produce benzyl phosphonyl dihalide as a product of the process.

References Cited in the file of this patent

Kosolapoff: "Organophosphorous Compounds" (1950), pp. 130–132.